(12) United States Patent
Islam et al.

(10) Patent No.: US 12,459,540 B2
(45) Date of Patent: Nov. 4, 2025

(54) SYSTEM AND METHOD OF IMITATING TARGET VEHICLE BEHAVIOR FOR AUTOMATED DRIVING

(71) Applicant: GM Global Technology Operations LLC, Detroit, MI (US)

(72) Inventors: Md Mhafuzul Islam, Warren, MI (US); Arun Adiththan, Sterling Heights, MI (US); Yubiao Zhang, Sterling Heights, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 237 days.

(21) Appl. No.: 18/296,567

(22) Filed: Apr. 6, 2023

(65) Prior Publication Data

US 2024/0336282 A1  Oct. 10, 2024

(51) Int. Cl.
*B60W 60/00* (2020.01)
*B60W 50/14* (2020.01)

(52) U.S. Cl.
CPC ........ *B60W 60/0015* (2020.02); *B60W 50/14* (2013.01); *B60W 60/0027* (2020.02); *B60W 2554/4026* (2020.02); *B60W 2554/4046* (2020.02); *B60W 2556/35* (2020.02); *B60W 2556/65* (2020.02)

(58) Field of Classification Search
CPC ........ G08G 1/22; G05D 1/695; B60W 30/165
See application file for complete search history.

(56) References Cited

U.S. PATENT DOCUMENTS

| 6,339,740 | B1 | 1/2002 | Seto et al. | |
|---|---|---|---|---|
| 10,407,047 | B2* | 9/2019 | Johnson | B60W 10/18 |
| 2010/0082195 | A1* | 4/2010 | Lee | B62D 15/0255 |
| | | | | 701/25 |
| 2012/0221168 | A1* | 8/2012 | Zeng | B60W 60/0018 |
| | | | | 701/1 |

(Continued)

FOREIGN PATENT DOCUMENTS

GB     2500426 A    9/2013

OTHER PUBLICATIONS

U.S. Appl. No. 18/174,827, filed Feb. 27, 2023.

*Primary Examiner* — Ramon A. Mercado
(74) *Attorney, Agent, or Firm* — Vivacqua Crane, PLLC

(57) ABSTRACT

A system for imitating target vehicle behavior in automated driving includes sensors capturing ego and target vehicle condition information, actuators selectively altering an ego vehicle state, and control modules. The control modules execute a target vehicle imitating (TVI) application. A first TVI control logic estimates a target vehicle state and trajectory. The ego and target vehicle condition information partially define the target vehicle state and trajectory. A second control logic evaluates target vehicle safety and performance constraints. A third control logic selectively initiates an imitation mode of the ego vehicle based on target and ego vehicle statuses relative to the target vehicle safety and performance constraints. A fourth control logic, models the target vehicle and optimizes a planned ego vehicle path subject to actuator constraints. A fifth control logic generates outputs to the actuators to cause the ego vehicle to follow the planned path and imitate the target vehicle.

17 Claims, 6 Drawing Sheets

(56) References Cited

U.S. PATENT DOCUMENTS

| | | | |
|---|---|---|---|
| 2013/0179036 A1* | 7/2013 | Lee | B62D 15/0255 |
| | | | 701/41 |
| 2016/0009281 A1 | 1/2016 | Tokimasa et al. | |
| 2016/0140843 A1* | 5/2016 | Tosa | H04W 4/40 |
| | | | 340/989 |
| 2018/0257647 A1* | 9/2018 | Jurca | G01S 13/931 |
| 2018/0348769 A1* | 12/2018 | Sato | B60W 30/02 |
| 2019/0378363 A1* | 12/2019 | Becker | G05D 1/0221 |
| 2020/0326701 A1* | 10/2020 | Takechi | H04W 4/021 |
| 2021/0325197 A1* | 10/2021 | Ohmura | G01C 21/3484 |
| 2024/0043002 A1 | 2/2024 | Beaucaire et al. | |

* cited by examiner

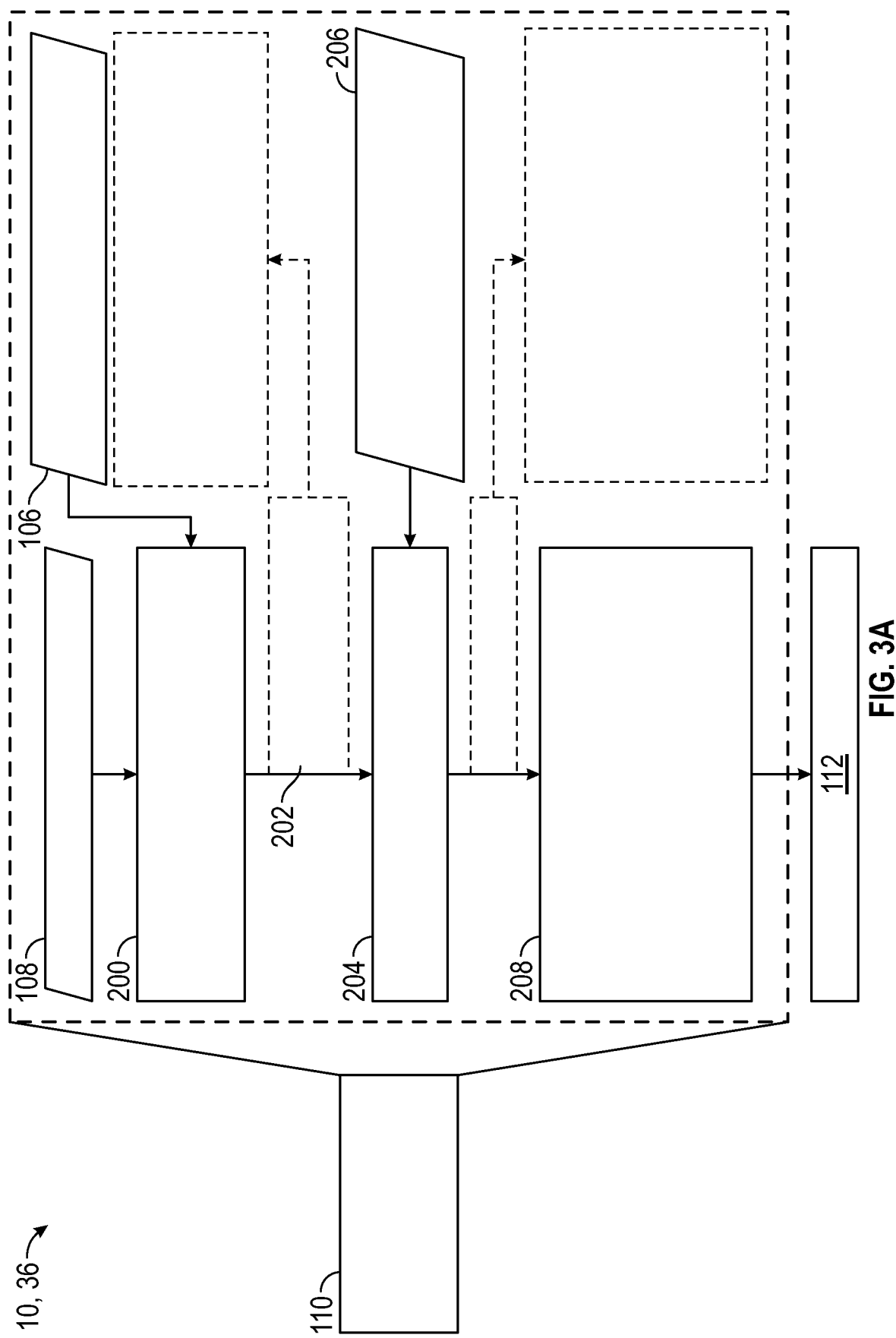

SYSTEM AND METHOD OF IMITATING TARGET VEHICLE BEHAVIOR FOR AUTOMATED DRIVING

INTRODUCTION

The present disclosure relates to vehicle control systems and more specifically to automated driver assistance systems (ADAS) that control vehicle dynamics. Increasingly, vehicles are being equipped with ADAS systems that control or aid vehicle occupants in controlling a wide variety of vehicle dynamic functions. Some vehicles are available with varying degrees of "hands-off" functionality in which the vehicle can operate without human input for varying periods of time, or until the occurrence of a particular condition or set of conditions. Vehicles equipped with ADAS functionality require input from a variety of different sensors and many also communicate with other vehicles through vehicle-to-vehicle (V2V) communication systems, or with infrastructure through vehicle-to-infrastructure (V2I) communication systems.

However, not all vehicles support V2V or V2I communication, and without such communication ADAS functionality can be limited, and human vehicle operator input may be required to frequently make corrections or assist in driving the vehicle. Accordingly, while current systems and methods for controlling vehicle functions through ADAS operate for their intended purpose, there is a need for new and improved systems and methods for controlling vehicle dynamic functions with ADAS that operate to allow ego or host vehicles to follow target vehicles without requiring significant vehicle operator input, and while continuously monitoring target vehicle parameters behavior, and accurately imitating target vehicle behavior without increasing complexity, while improving ADAS functionality and redundancy, and while maintaining or improving vehicle operator comfort.

SUMMARY

According to several aspects, of the present disclosure, a system for imitating target vehicle behavior in ego vehicle automated driving includes one or more sensors of the ego vehicle and capturing ego vehicle condition information. The system also includes one or more sensors of the target vehicle and capturing target vehicle condition information. One or more actuators of a vehicle dynamics system disposed on the ego vehicle selectively alter a state of the ego vehicle. One or more control modules are disposed in the ego vehicle. Each of the one or more control modules has a processor, a memory, and one or more input/output (I/O) ports. The I/O ports are in communication with the one or more sensors and the one or more actuators of the ego vehicle and of the target vehicle. The memory stores programmatic control logic. The processor executes the programmatic control logic. The programmatic control logic includes a target vehicle imitating (TVI) application. The TVI application includes at least a first, a second, a third, a fourth, and a fifth control logic. The first control logic estimates a target vehicle state, and estimates a target vehicle trajectory. The ego vehicle condition information and the target vehicle condition information partially define the target vehicle state and the target vehicle trajectory. The second control logic evaluates target vehicle safety and performance constraints. The third control logic selectively initiates an imitation mode of the ego vehicle based on a status of the target vehicle and the ego vehicle relative to the target vehicle safety and performance constraints. The fourth control logic, within the imitation mode, engages a model predictive control (MPC) algorithm that models the target vehicle and optimizes a planned ego vehicle path subject to actuator constraints. The fifth control logic generates outputs to the one or more actuators to cause the ego vehicle to follow the planned ego vehicle path and imitate driving behavior of the target vehicle.

In another aspect of the present disclosure first control logic further includes control logic that generates fused sensor data by fusing data captured by the one or more sensors and data obtained from vehicle-to-vehicle (V2V) communications between the ego vehicle and the target vehicle. The first control logic also includes control logic that filters the fused data and ego vehicle state data, and control logic that determines a time and space gap between the ego vehicle and the target vehicle from the fused data and the ego vehicle state data.

In another aspect of the present disclosure the control logic that filters the fused data and the ego vehicle state data further includes control logic that executes one or more of: a Kalman filter, an unscented Kalman filter, a Dynamic Data Reconciliation (DDR) filter, and a Particle filter.

In another aspect of the present disclosure the first control logic further includes control logic that generates a state buffer including ego vehicle state information, target vehicle state information, ego vehicle trajectory information, and target vehicle trajectory information at a plurality of time steps up to a maximum time and space horizon. The maximum time and space horizon is defined by a coverage range of ego vehicle and target vehicle sensors.

In another aspect of the present disclosure the second control logic further includes control logic for applying target vehicle safety and performance constraints to data from the state buffer. The target vehicle safety constraints include a speed limit, a target vehicle position relative to lane markings on a road surface, a time to a possible collision (TTC). The performance constraints include a status of each of the one or more sensors of the ego vehicle, a status of communications between the ego vehicle and the target vehicle, and a data latency.

In another aspect of the present disclosure the third control logic further includes control logic that, upon determining that the target vehicle performance constraints have been met, initiates an imitation mode of an advanced driver assistance system (ADAS) of the ego vehicle, and upon determining that the target vehicle performance constraints have not been met, informs a vehicle operator that the imitation mode is unavailable via a human-machine interface (HMI).

In another aspect of the present disclosure the system further includes control logic that utilizes the ego vehicle state information, the maximum time and space horizon, and the target vehicle safety and performance constraints as inputs to the MPC algorithm. The control logic further includes control logic that generates a simplified model of one or more of the ego vehicle and the target vehicle. In the simplified model, one or more of the ego vehicle and the target vehicle is represented as a bicycle. The control logic further includes control logic that models a planned path of the ego vehicle based on the target vehicle safety and performance constraints, the ego vehicle state, the maximum time and space horizon, the target vehicle state, and the target vehicle trajectory.

In another aspect of the present disclosure the control logic further includes control logic that optimizes the planned ego vehicle path by minimizing a value of a cost function of the MPC algorithm and constraining commands to the one or more actuators of the ego vehicle's vehicle dynamics system to be within predefined actuator constraints.

In another aspect of the present disclosure minimizing a value of a cost function further includes control logic that minimizes a value of a target vehicle tracking error. The target vehicle tracking error includes a longitudinal motion error, a lateral motion error, and a yaw motion error. Each of the longitudinal, lateral, and yaw motion errors defines a difference between a predicted target vehicle motion and an actual target vehicle motion relative to the ego vehicle.

In another aspect of the present disclosure the fifth control logic further includes control logic that generates outputs to the one or more actuators, including: power steering requests for a steering system, torque requests for a powertrain system, and braking requests for a braking system of the ego vehicle. The outputs to the one or more actuators have magnitudes and directionality that cause the ego vehicle to follow and imitate driving behavior of the target vehicle while the target vehicle safety and performance constraints, and the actuator constraints are being met.

In another aspect of the present disclosure a method for imitating target vehicle behavior in ego vehicle automated driving includes capturing ego vehicle condition information with one or more sensors of the ego vehicle and capturing target vehicle condition information with one or more sensors of the target vehicle. The method further includes selectively altering a state of the ego vehicle with one or more actuators of a vehicle dynamics system disposed on the ego vehicle. The method further includes executing a programmatic control logic including a target vehicle imitating (TVI) application stored in memory of one or more control modules disposed on the ego vehicle. Each of the one or more control modules has a processor, the memory, and one or more input/output (I/O) ports. The I/O ports in communication with the one or more sensors of the ego vehicle and of the target vehicle, and in communication with the one or more actuators. The processor executes the programmatic control logic, including: estimating a target vehicle state, and for estimating a target vehicle trajectory, the ego vehicle condition information and the target vehicle condition information partially defining the target vehicle state and the target vehicle trajectory. The method further includes evaluating target vehicle safety and performance constraints, selectively initiating an imitation mode of the ego vehicle based on a status of the target vehicle and the ego vehicle relative to the target vehicle safety and performance constraints, and engaging a model predictive control (MPC) algorithm within the imitation mode, that models the target vehicle and optimizes a planned ego vehicle path subject to actuator constraints. The method further includes generating outputs to the one or more actuators and causing the ego vehicle to follow the planned ego vehicle path and imitate driving behavior of the target vehicle.

In another aspect of the present disclosure the method further includes generating fused sensor data by fusing data captured by the one or more sensors of the ego vehicle and data obtained from vehicle-to-vehicle (V2V) communications between the ego vehicle and the target vehicle. The method further includes filtering the fused data and ego vehicle state data and determining a time and space gap between the ego vehicle and the target vehicle from the fused data and the ego vehicle state data.

In another aspect of the present disclosure the method further includes filtering the fused data and the ego vehicle state data further includes filtering the fused data with one or more of: a Kalman filter, an unscented Kalman filter, a Dynamic Data Reconciliation (DDR) filter, and a Particle filter.

In another aspect of the present disclosure the method further includes generating a state buffer including ego vehicle state information, target vehicle state information, ego vehicle trajectory information, and target vehicle trajectory information at a plurality of time steps up to a maximum time and space horizon. The maximum time and space horizon is defined by a coverage range of ego vehicle and target vehicle sensors.

In another aspect of the present disclosure the method further includes applying target vehicle safety and performance constraints to data from the state buffer. The target vehicle safety constraints include a speed limit, a target vehicle position relative to lane markings on a road surface, a time to a possible collision (TTC). The performance constraints include a status of each of the one or more sensors, a status of communications between the ego vehicle and the target vehicle, and a data latency.

In another aspect of the present disclosure, upon determining that the target vehicle performance constraints have been met, the method initiates the imitation mode of an advanced driver assistance system (ADAS) of the ego vehicle, and upon determining that the target vehicle performance constraints have not been met, the method informs a vehicle operator that the imitation mode is unavailable via a human-machine interface (HMI).

In another aspect of the present disclosure the method further includes utilizing the ego vehicle state information, the maximum time and space horizon, and the target vehicle safety and performance constraints as inputs to the MPC algorithm. The method further includes generating a simplified model of one or more of the ego vehicle and the target vehicle. In the simplified model, one or more of the ego vehicle and the target vehicle is represented as a bicycle. The method further includes modeling a planned path of the ego vehicle based on the target vehicle safety and performance constraints, the ego vehicle state, the maximum time and space horizon, the target vehicle state, and the target vehicle trajectory.

In another aspect of the present disclosure the method further includes optimizing the planned ego vehicle path by minimizing a value of a cost function of the MPC algorithm, including: minimizing a value of a target vehicle tracking error. The target vehicle tracking error includes: a longitudinal motion error, a lateral motion error, and a yaw motion error. Each of the longitudinal, lateral, and yaw motion errors defines a difference between a predicted target vehicle motion and an actual target vehicle motion relative to the ego vehicle. The method further includes constraining commands to the one or more actuators of the ego vehicle's vehicle dynamics system to be within predefined actuator constraints.

In another aspect of the present disclosure the method further includes generating outputs to the one or more actuators, including: generating power steering requests for a steering system, generating torque requests for a powertrain system, and generating braking requests for a braking system of the ego vehicle. The outputs to the one or more actuators have magnitudes and directionality that cause the ego vehicle to follow and imitate driving behavior of the target vehicle while the target vehicle safety and performance constraints, and the actuator constraints are being met.

In another aspect of the present disclosure a method for imitating target vehicle behavior in ego vehicle automated driving includes capturing ego vehicle condition information with one or more sensors of the ego vehicle and capturing target vehicle condition information with one or more sensors of the target vehicle. The method further includes selectively altering a state of the ego vehicle with one or more actuators of a vehicle dynamics system disposed on the ego vehicle. The method further includes executing a target vehicle imitating (TVI) application stored in memory of one or more control modules disposed on the ego vehicle, each of the one or more control modules having a processor, the memory, and one or more input/output (I/O) ports. The I/O ports are in communication with the one or more sensors of the ego vehicle and of the target vehicle, and in communication with the one or more actuators. The processor executes the programmatic control logic, including: estimating a target vehicle state, and for estimating a target vehicle trajectory, the ego vehicle condition information and the target vehicle condition information partially defining the target vehicle state and the target vehicle trajectory. The method further includes generating fused sensor data by fusing data captured by the one or more sensors of the ego vehicle and data obtained from vehicle-to-vehicle (V2V) communications between the ego vehicle and the target vehicle. The method further includes filtering the fused data and ego vehicle state data with one or more of: a Kalman filter, an unscented Kalman filter, a Dynamic Data Reconciliation (DDR) filter, and a Particle filter. The method further includes determining a time and space gap between the ego vehicle and the target vehicle from the fused data and the ego vehicle state data. The method further includes generating a state buffer including ego vehicle state information, target vehicle state information, ego vehicle trajectory information, and target vehicle trajectory information from filtered fused data at a plurality of time steps up to a maximum time and space horizon. The maximum time and space horizon is defined by a coverage range of the one or more ego vehicle and one or more target vehicle sensors. The method further includes evaluating target vehicle safety and performance constraints by applying target vehicle safety and performance constraints to data from the state buffer. The target vehicle safety constraints include: a speed limit, a target vehicle position relative to lane markings on a road surface, a time to a possible collision (TTC). The performance constraints include: a status of each of the one or more sensors, a status of communications between the ego vehicle and the target vehicle, and a data latency. Upon determining that the target vehicle performance constraints have been met, the method initiates an imitation mode of an advanced driver assistance system (ADAS) of the ego vehicle. Upon determining that the target vehicle performance constraints have not been met, the method informs a vehicle operator that the imitation mode is unavailable via a human-machine interface (HMI). The method further includes selectively initiating an imitation mode of the ego vehicle based on a status of the target vehicle and the ego vehicle relative to the target vehicle safety and performance constraints, and engaging a model predictive control (MPC) algorithm within the imitation mode, that models the target vehicle and optimizes a planned ego vehicle path subject to actuator constraints. The method further includes utilizing the ego vehicle state information, the maximum time and space horizon, and the target vehicle safety and performance constraints as inputs to the MPC algorithm. The method further includes generating a simplified model of one or more of the ego vehicle and the target vehicle. In the simplified model, one or more of the ego vehicle and the target vehicle is represented as a bicycle. The method further includes modeling a planned path of the ego vehicle based on the target vehicle safety and performance constraints, the ego vehicle state, the maximum time and space horizon, the target vehicle state, and the target vehicle trajectory. The method further includes optimizing the planned ego vehicle path by minimizing a value of a cost function of the MPC algorithm, including: minimizing a value of a target vehicle tracking error. The target vehicle tracking error includes: a longitudinal motion error, a lateral motion error, and a yaw motion error. Each of the longitudinal, lateral, and yaw motion errors defines a difference between a predicted target vehicle motion and an actual target vehicle motion relative to the ego vehicle. The method further includes constraining commands to the one or more actuators of the ego vehicle's vehicle dynamics system to be within predefined actuator constraints. The method further includes generating outputs to the one or more actuators, including: generating power steering requests for a steering system, generating torque requests for a powertrain system, and generating braking requests for a braking system of the ego vehicle. The outputs to the one or more actuators have magnitudes and directionality that cause the ego vehicle to follow and imitate driving behavior of the target vehicle while the target vehicle safety and performance constraints, and the actuator constraints are being met.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3A is a detailed logical flowchart depicting programmatic control logic for estimating a state and trajectory of a target vehicle of the system for imitating target vehicle behavior of FIG. 1 according to an exemplary embodiment;

DETAILED DESCRIPTION

The following description is merely exemplary in nature and is not intended to limit the present disclosure, application, or uses.

Figure 1:
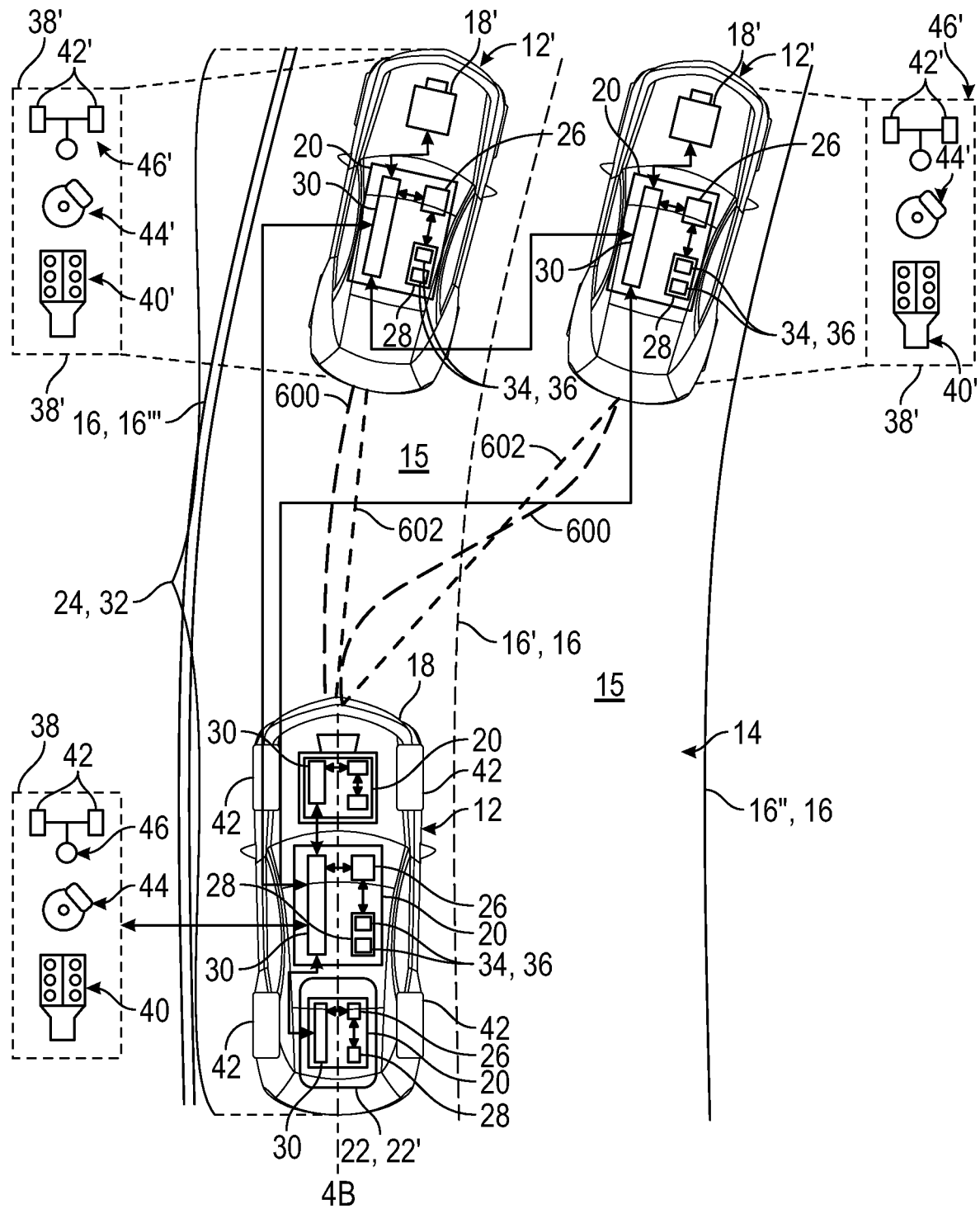
FIG. 1 is an environmental view of a system for imitating target vehicle behavior for automated driving according to an exemplary embodiment.

Referring to FIG. 1 a system 10 for controlling an ego vehicle 12 imitating a target vehicle 12' during automated driving is shown. The ego vehicle 12 and target vehicle 12' may be any of a wide variety of vehicles 12 without departing from the scope or intent of the present disclosure. In some examples, the ego vehicle 12 and the target vehicle 12' may be cars, trucks, sport-utility vehicles (SUVs), busses, semi-tractors, tractors used in farming or construction or the like, watercraft, aircraft such as planes or helicopters, or the like. Further, it should be appreciated the that the ego vehicle 12 and target vehicle 12' may be the same type of vehicle or may be different from one another. The ego and target vehicles 12, 12' are shown traveling on a road 14 having a plurality of lanes 15 defined by lane markings 16. The ego and target vehicles 12, 12' may travel along any type of road 14 having any type of road 14 surface, including any type of pavement, gravel, dirt, ice, or other types of surfaces. Further, while the lane markings 16 are shown as dashed lines 16', single solid lines 16" and double solid lines 16''', it should be appreciated that any types of road markings or lane markings 16 may be present without departing from the scope or intent of the present disclosure.

The system 10 generally includes one or more sensors 18 in communication with one or more control modules 20, and may include a human machine interface (HMI) 22 also in communication with the one or more control modules 20. While only a single sensor 18 is shown on the ego vehicle 12, and the sensor 18 depicted is a camera, it should be appreciated that the sensor 18 shown is intended to represent any of a variety of sensors 18 which may be linked to and communicate on the communications network 24. The sensors 18 may capture ego vehicle 12 position information, electromagnetic and/or optical information in a variety of different wavelengths including those visible to humans as well as infrared, ultraviolet, and other such portions of the light spectrum that are not visible by humans. That is, the sensors 18 may be Global Positioning System (GPS) sensors, cameras, Light Detection and Ranging (LiDAR) sensors, Radio Detection and Ranging (RADAR) sensors, Sound Navigation and Ranging (SONAR) sensors, ultrasonic sensors, inertial measurement units (IMUs), wheel speed sensors, or any of a wide variety of other sensors 18 that can be used to determine the ego vehicle's 12 dynamic state and position relative to the environment surrounding the ego vehicle 12 without departing from the scope or intent of the present disclosure. The sensors 18 may be integrated with the ego vehicle 12 by the ego vehicle 12 manufacturer, or the sensors 18 may be fitted in an after-sales service performed by the ego vehicle 12 or sensor 18 manufacturer, by the customer, or by other third parties without departing from the scope or intent of the present disclosure. In some examples, the sensor 18 or sensors 18 may be part of a stand-alone sensor 18 system without departing from the scope or intent of the present disclosure.

In several examples, the HMI 22 may be an onboard infotainment screen, an instrument cluster, or the like disposed within or on a vehicle 12, and/or the HMI 22 may be a user-provided device, including but not limited to a screen integrated with the sensor 18, or a third-party device such as a smart phone 22', tablet computer, laptop computer, desktop computer, television, monitor, or any other such HMI 22 having a screen visible to humans for depicting images and/or videos.

The control modules 20 are non-generalized electronic control devices having a preprogrammed digital computer or processor 26, non-transitory computer readable medium or memory 28 used to store data such as control logic, software applications, instructions, computer code, data, lookup tables, etc., and one or more input/output (I/O) ports 30. Computer readable medium or memory 28 includes any type of medium capable of being accessed by a computer, such as read-only memory (ROM), random access memory (RAM), a hard disk drive, a compact disc (CD), a digital video disc (DVD), solid-state memory, or any other type of memory. A "non-transitory" computer readable medium or memory 28 excludes wireless, optical, or other communication links that transport electrical or other signals. A non-transitory computer readable medium or memory 28 includes media where data can be permanently stored and media where data can be stored and later overwritten, such as any type of program code, including source code, object code, and executable code. The processor 26 is configured to execute the code or instructions. In some examples, the control module 20 may be a dedicated wireless or Wi-Fi controller. The I/O ports 30 are configured to communicate through wired or wireless means using Wi-Fi protocols under IEEE 802.11x, Bluetooth communications protocols, radio frequency (RF) protocols, or the like. In several examples, the ego vehicle 12 and target vehicles 12' may communicate over a vehicle-to-vehicle (V2V) network 32, a vehicle-to-infrastructure (V2I) network, or the like.

In several aspects, the control modules 20 include one or more applications 34. An application 34 is a software program configured to perform specific functions or sets of functions. The application 34 may include one or more computer programs, software components, sets of instructions, procedures, functions, objects, classes, instances, related data, or a portion thereof adapted for implementation in a suitable computer readable program code. The applications 34 may be stored within the memory 28 or in an additional or separate memory 28. Examples of the applications 34 include audio or video streaming services, audio or visual processing services, a target vehicle imitating (TVI) application 36, and the like.

In several aspects, the TVI application 36 selectively utilizes an advanced driver assistance system (ADAS) to alter ego vehicle 12 dynamics through actuators of the ego vehicle's 12 vehicle dynamics system 38. In some examples, the actuators of the vehicle dynamics system 38 may include a powertrain 40 providing motive rotational force to one or more wheels 42 of the ego vehicle 12. The powertrain 40 may include an internal combustion engine, a transmission, driveshafts, and the like, and/or one or more electric motors, or other such prime movers without departing from the scope or intent of the present disclosure. Additional vehicle dynamics system 38 actuators include one or more brakes 44 which operate to reduce, limit, or completely stop rotation of the wheels 42 and/or of the powertrain 40 directly. The vehicle dynamics system 38 actuators may also include a steering system 46 that can modify the angular orientation of one or more of the wheels 42 of the ego vehicle 12 relative a longitudinal axis 48 of the ego vehicle 12. By alteration of the angular orientation of the one or more wheels 42 a direction of travel of the ego vehicle 12 may be changed.

Figure 2:
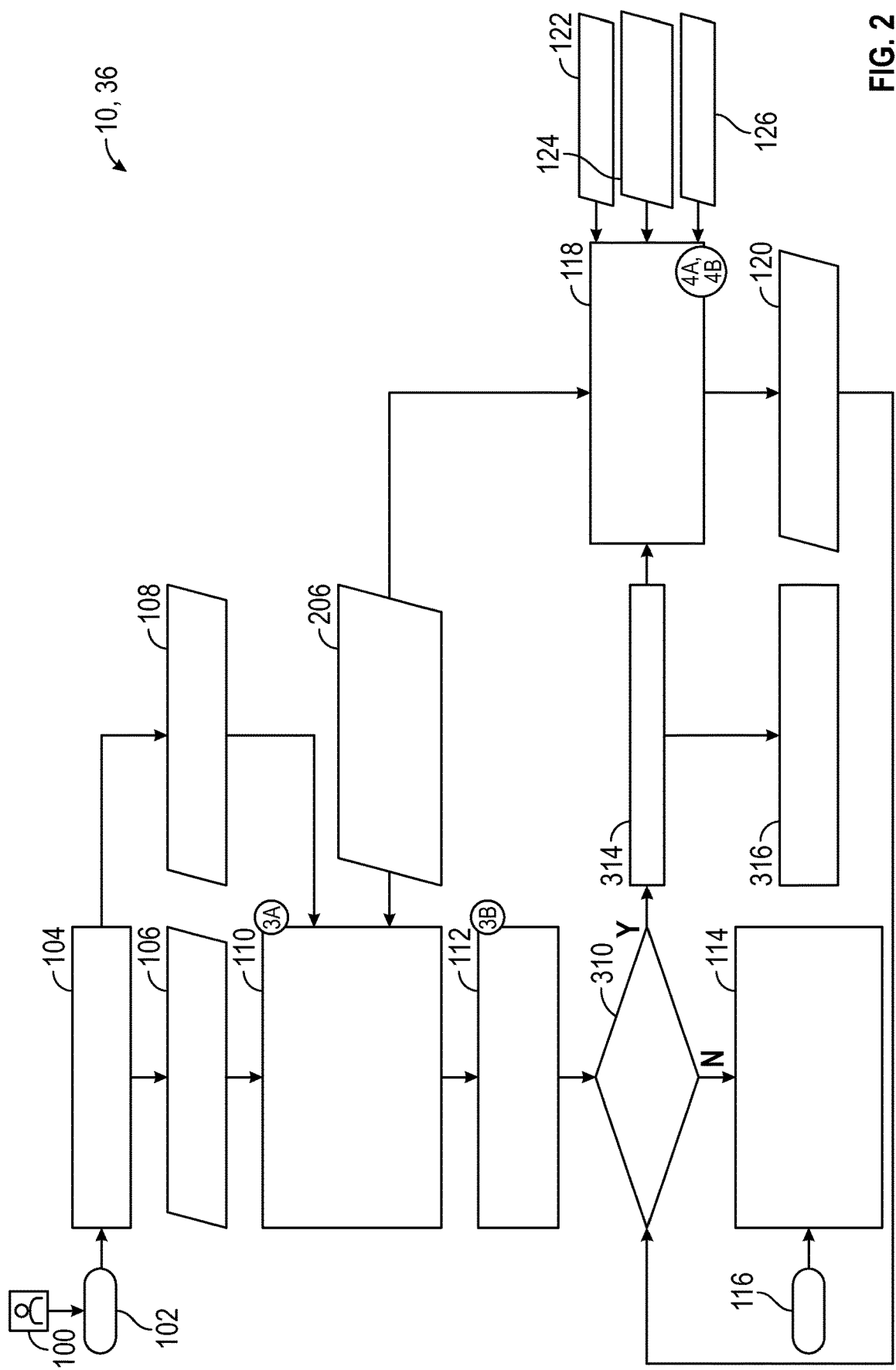
FIG. 2 logical flowchart depicting the system for imitating target vehicle behavior for automated driving of FIG. 1 according to an exemplary embodiment.

Turning now to FIG. 2 with continuing reference to FIG. 1, the system 10 is shown in further detail. More specifically, FIG. 2 depicts an overall logical flow of the TVI application 36 that allows the ego vehicle 12 to follow and mimic the actions of a target vehicle 12' during ego vehicle 12 automated driving. The TVI application 36 is stored in memory 28 of at least one control module 20 of the ego vehicle 12. In several aspects, the TVI application 36 contains a plurality of subroutines or programmatic control logic portions that enable the ego vehicle 12 to follow and imitate the actions of a selected target vehicle 12'.

In an ego vehicle 12 equipped with the system 10 of the present disclosure, a vehicle occupant 100 may engage the TVI application 36 through the HMI 22 through one or more audio and/or visual on-screen prompts or requests presented on the HMI 22. In several aspects, the one or more prompts or requests define at least a start prompt 102. The start prompt 102 may take any of a variety of forms, including but not limited to presenting through audio and/or visual means of the one or more HMIs 22 that the TVI application 36 is available for use. In response to the presentation of the start prompt 102, the vehicle occupant 100 may initiate the TVI application 36, by selecting the start prompt 102 which generates a first input 104 to the system. The first input 104 is a start or activation command which is received by the I/O ports 30 of the control module 20, and cause the control module 20 to initiate the TVI application 36.

Upon receiving the first input 104, the TVI application 36 collects information from the various sensors 18 at blocks 106 and 108. Specifically, at block 106, the ego vehicle 12 communicates with one or more target vehicles 12' through the V2V network 32 to obtain target vehicle 12' state information. At block 108, the onboard sensors 18 of the ego vehicle 12 obtain ego vehicle 12 state information as well as road 14 condition information through use of GPS, cameras, LiDAR, RADAR, SONAR, ultrasonic, IMUs, wheel speed sensors or other such sensors 18 that can be used to determine the ego vehicle's 12 position relative to the environment surrounding the ego vehicle 12. Additionally, at block 108, the sensor 18 data is fused together to generate a precise and accurate understanding of the ego vehicle's 12 position relative to target vehicles 12' as well as other objects, obstacles, and road and weather condition information regarding the ego vehicle's 12 environment.

At block 110, the TVI application 36 utilizes the information from the ego vehicle's 12 sensors to determine an ego vehicle 12 state. The ego vehicle 12 state may be defined as a vector of the form:

1. [$V_x$, $V_y$, X, Y, yaw$_{rate}$, $\theta$], where $V_x$ is a velocity of the ego vehicle 12 in the X-direction, $V_y$ is a velocity of the ego vehicle 12 in the Y-direction, X is an X-position of the ego vehicle 12, Y is a Y-position of the ego vehicle 12, yaw$_{rate}$ is a rate of yaw of the ego vehicle 12 and $\theta$ is an angular orientation of the ego vehicle 12.

At block 110, the target vehicle 12' from block 106, and the sensor data from block 108 taken as inputs to estimate the target vehicle 12' state and trajectory. Turning now to FIG. 3A and with continuing reference to FIGS. 1 and 2, a control logic for estimating and arbitrating the target vehicle 12' state and trajectory at block 110 is shown in further detail. To estimate the target vehicle's 12' state and trajectory, the target vehicle 12' state information from block 106 and the fused sensor data from block 108 are filtered at block 200. In several aspects, the target vehicle 12' state estimation and arbitration is carried out through use of one or more of a Kalman filter, an unscented Kalman filter, a Dynamic Data Reconciliation (DDR) filter, a Particle filter or the like, and outputs of the filtration at block 200 take the form of a vector defining various aspects of the target vehicle 12' state 202. For example, the state vector for the target vehicle 12' may be defined as:

2. [$V'_x$, $V'_y$, X', Y', yaw'$_{rate}$, $\theta'$], where $V'_x$ is a velocity of the target vehicle 12' in the X-direction, $V'_y$ is a velocity of the target vehicle 12' in the Y-direction, X' is an X-position of the target vehicle 12', Y' is a Y-position of the target vehicle 12', yaw'$_{rate}$ is a rate of yaw of the target vehicle 12' and $\theta'$ is an angular orientation of the target vehicle 12'. It should be appreciated that the target vehicle 12' state vector 2. [$V'_x$, $V'_y$, X', Y', yaw'$_{rate}$, $\theta'$]

is defined in coordinate space that is relative to the ego vehicle's 12 own state vector 1. [$V_x$, $V_y$, X, Y, yaw$_{rate}$, $\theta$].

At block 204 the system 10 determines a time and/or space gap between the ego vehicle 12 and the target vehicle 12'. The time and/or space gap are determined from the ego vehicle 12 state estimation and arbitration at block 200 and the current ego vehicle 12 state information as reported directly from the various sensors 18 of the ego vehicle 12 at block 206. In several aspects, the time and/or space gap define temporal and physical distances between the present location of each of the ego and target vehicles 12, 12', and future positions of the ego and target vehicles 12, 12' at a future point in time. A minimum value of the time and/or space gap may be defined as a time/space headway+$\delta$; $\delta$ which depends on the ego vehicle 12 following patterns, such as predefined and/or flexible constraints, such as close, mid-range, or long-range following distances which may vary based on application, hardware, visibility, road 14 conditions, ambient weather, and the like. Likewise, a maximum physical value of the time/space gap is a horizon defined by a maximum effective coverage range of ego and/or target vehicle 12, 12' sensors 18, 18'. That is, the ego and/or target vehicle 12, 12' sensors 18, 18' have hardware-specific and/or software-enforced capabilities that may include a minimum and/or maximum perception range, or the like. For example, a camera of the system 10 may have a limited field of view based on focal length, optical and/or digital zoom capabilities, physical view constraints, or the like. Ego vehicle 12 and target vehicle 12' state and trajectory information are stored in a state buffer 208 for each time step. That is, at a first time $t_1$, the estimated ego vehicle 12 state and trajectory may be stored as, 3. ($t_1$, [$V_x$, $V_y$, X, Y, yaw rate, $\theta$], $t_2$, [$V_x$, $V_y$, X, Y, yaw$_{rate}$, $\theta$], . . . $t_n$, [$V_x$, $V_y$, X, Y, yaw$_{rate}$, $\theta$]), likewise, the estimated target vehicle 12' state and trajectory may be stored as 4. $t_1$ [$V'_x$, $V'_y$, X', Y', yaw'$_{rate}$, $\theta'$], $t_2$ [$V'_x$, $V'_y$, X', Y', yaw'$_{rate}$, $\theta'$], . . . , $t_n$, [$V'_x$, $V'_y$, X', Y', yaw'$_{rate}$, $\theta'$]), where $t_n$ is the time horizon over which the ego and target vehicle 12, 12' states and trajectories are calculated. In several examples, the time horizon is a predetermined and/or flexible amount of time for which the ego and target vehicle 12, 12' states and trajectories have been found to be reliable and predictable based on road 14 conditions, vehicle 12, 12' speeds, road 14 types, and/or sensor 18 limitations, or the like.

Figure 3B:
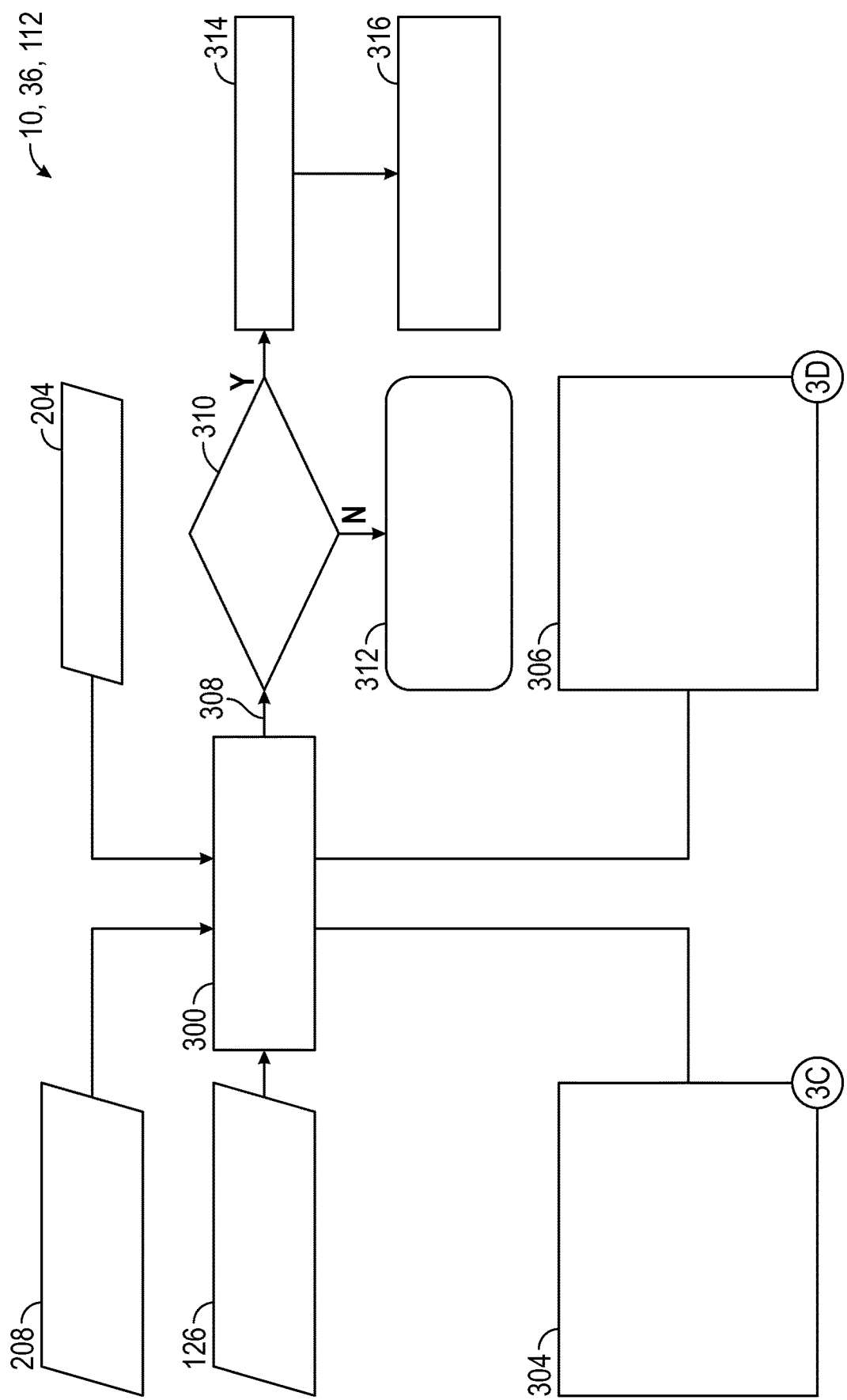
FIG. 3B is a detailed logical flowchart depicting programmatic control logic functions for determining when the system for imitating target vehicle behavior of FIG. 1 may properly be engaged according to an exemplary embodiment.

Referring once more to FIGS. 2 and 3B, and with continuing reference to FIGS. 1 and 3A, the estimated target vehicle 12' state and trajectory from the state buffer 208 are evaluated at block 112 of the TVI application 36 to determine whether target vehicle 12' safety and performance constraints 126 are presently being met. More specifically a constraint satisfaction monitor 300 evaluates the target vehicle 12' state buffer 208 data, the ego vehicle 12 state 206 against safety and performance constraints 126. In several aspects, the safety and performance constraints 126 include hard-coded, flexibly set, or otherwise predefined safety and performance thresholds that must be met for the TVI application 36 to be enabled. In several examples, the constraints may include a speed limit, a lookup time horizon, and the like. The constraint satisfaction monitor 300 includes at least a performance monitor 304 and a safety monitor 306 which are shown in additional detail in FIGS. 3C and 3D, respectively.

Figure 3C:
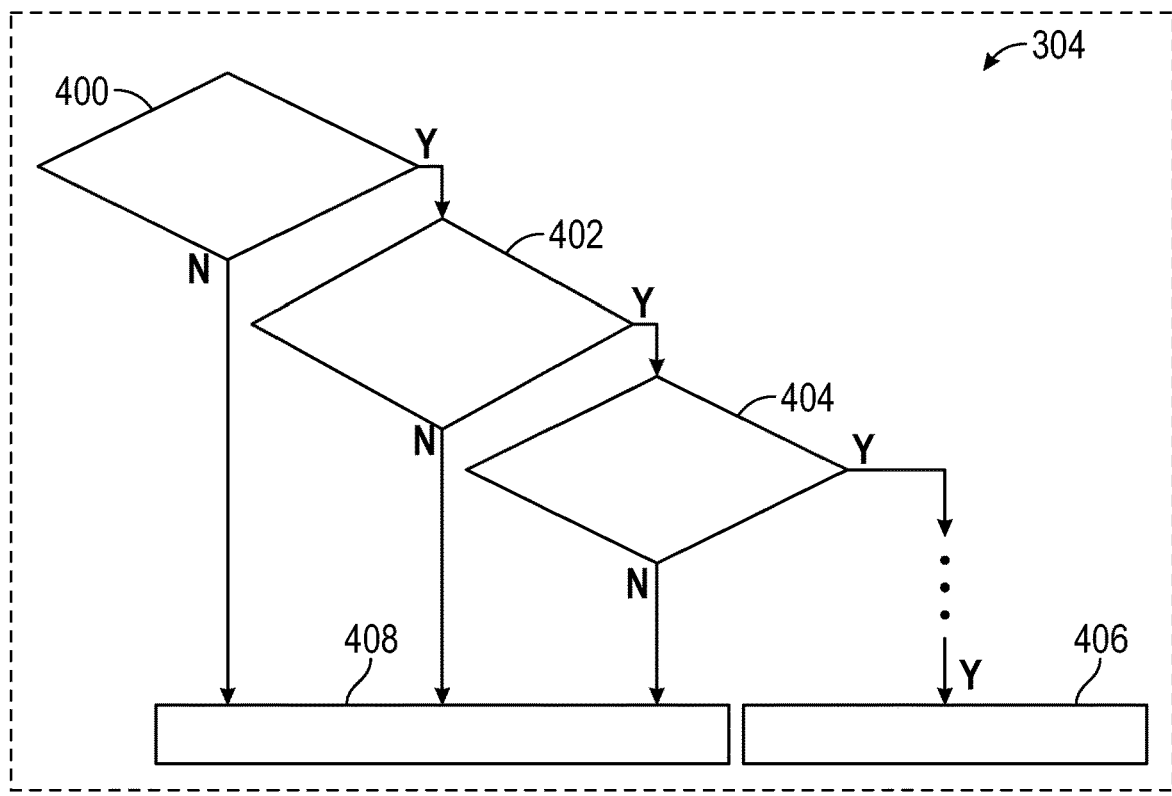
FIG. 3C is a flowchart depicting programmatic control logic for determining whether target vehicle performance constraints have been satisfied in the system for imitating target vehicle behavior of FIG. 3B according to an exemplary embodiment.

In FIG. 3C, in several aspects, the performance monitor 304 determines a status of each of the sensors 18. More specifically, the performance monitor 304 determines whether each of the sensors 18 is currently operational at block 400. Upon determining that all sensors 18 are operational, the performance monitor 304 proceeds to block 402 where the performance monitor 304 determines whether the communications and/or V2V network 24, 32 is active. Upon determining that the communications and/or V2V network 24, 32 is active, the performance monitor 304 proceeds to block 404. At block 404, the performance monitor 304 determines whether data latency is less than a predetermined threshold. The data latency may include a variety of different types of data production and/or transmission delays. That is, the data latency may depend at least in part on the types of sensors 18 and update or refresh rates for each of the sensors 18 and/or the data latency may depend upon wireless or wired communications bandwidth and quality on the communications and/or V2V network 24, 32. The predetermined data latency threshold depends upon a variety of factors, but should be understood generally to be set according to the ego vehicle 12 state and trajectory, and the target vehicle 12' state and trajectory such that ego and target vehicle 12, 12' speeds, accelerations, and other such dynamics fall within possible performance parameters. Upon determining that data latency is less than the predetermined threshold, the performance monitor 304 proceeds to block 406 where the performance monitor 304 reports that the performance constraints have been satisfied. By contrast, upon determining at block 400 that the sensors 18 are not all operational and/or that at block 402 that the communications and/or V2V network 24, 32 is inactive, and/or that at block 404 that the data latency is equal to or greater than the predetermined threshold, the performance monitor 304 reports at block 408 that the performance constraints have not been satisfied.

Figure 3D:
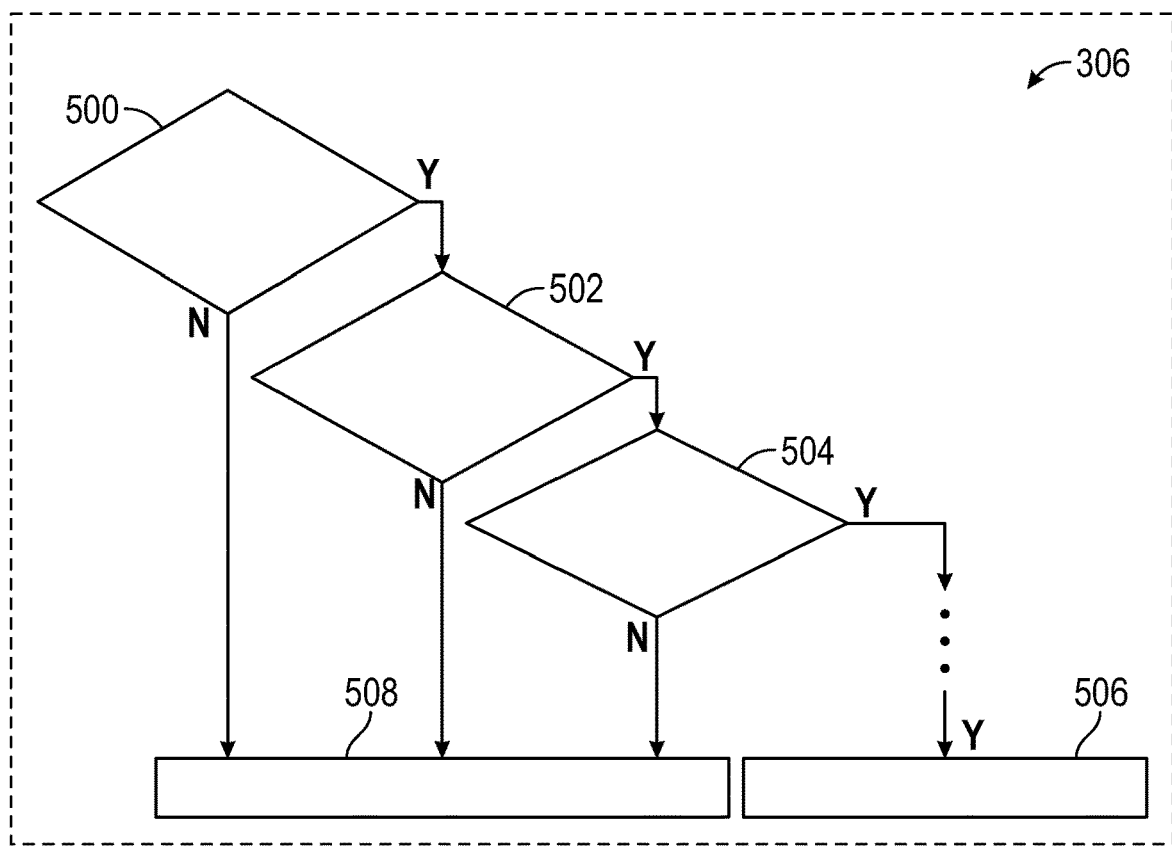
FIG. 3D is a flowchart depicting programmatic control logic for determining whether target vehicle safety constraints have been satisfied in the system for imitating target vehicle behavior of FIG. 3B according to an exemplary embodiment.

In FIG. 3D in several aspects, the safety monitor 306 determines whether the ego vehicle 12 and target vehicle 12' are operating within the speed limit for the current road 14 at block 500. Upon determining that the ego and target vehicles 12, 12' are operating within the speed limit, the safety monitor 306 proceeds to block 502 where the safety monitor 306 determines whether the time to a possible collision (TTC) is less than a predefined amount of time γ. Upon determining that the TTC is less than the predefined amount of time γ, the safety monitor 306 proceeds to block 504. At block 504, the safety monitor 306 determines whether the target vehicle 12' is operating in a stable manner. That is, at block 504, the safety monitor 306 utilizes predefined parameters to determine whether the target vehicle 12' is being driven in a manner consistent with road safety regulations, road 14 conditions, ambient weather conditions, and the like. In several aspects, at block 504, the safety monitor 306 assess whether the target vehicle 12' is being driven erratically, unsafely, or the like. Upon determining that the target vehicle 12' is being driven in a stable manner, the safety monitor 306 proceeds to block 506 and reports that safety constraints have been satisfied. By contrast, upon determining at block 500 that the ego and target vehicles 12, 12' are not being driven within the speed limit, or that at block 502 the TTC is greater than or equal to the predefined amount of time γ, or that at block 504 that the target vehicle 12' is not being driven in a stable manner, the safety monitor 306 proceeds to block 508 and reports that the safety constraints have not been satisfied.

Referring once more to FIG. 3B in particular, and with continuing reference to FIGS. 1, 2, 3A, 3C and 3D, once the constraint satisfaction monitor 300 has evaluated the target vehicle 12' state buffer 208 data, the ego vehicle 12 state 206 against safety and performance constraints 126 via the performance monitor 304 and the safety monitor 306, the constraint satisfaction monitor transmits constraint satisfaction output 308. The constraint satisfaction output 308 includes at least one output from each of the performance monitor 304 and the safety monitor 306. More specifically, the constraint satisfaction output 308 includes one output of the performance monitor 304 stating either that the performance constraints have been satisfied 406 or that the performance constraints have not been satisfied at block 408, and one output of the safety monitor 306 stating either that the safety constraints have been satisfied at block 506 or that the safety constraints have not been satisfied at block 508.

At block 310, the constraint satisfaction output 308 is evaluated to determine whether an imitation feature of the TVI application 36 can be enabled. Upon determining that the constraint satisfaction monitor 300 has not been satisfied, i.e. that one or more of the performance monitor 304 and/or the safety monitor 306 includes constraints that have not been satisfied, the TVI application 36 determines that the imitation feature should not be enabled and proceeds to block 312 where the TVI application 36 informs the vehicle occupants 100 via the HMI 22, 22' that the imitation feature is not available. By contrast, if the constraint satisfaction monitor 300 has been fully satisfied, the TVI application 36 determines at block 310 that the imitation feature may be enabled and informs the vehicle occupants 100 via the HMI 22, 22' of the availability of the imitation feature at block 314. In some examples, an additional confirmation prompt may be presented to the vehicle occupants 100 through audiovisual means at block 316, such as the HMI 22, 22', and in response to the confirmation prompt, the vehicle occupants 100 may affirmatively engage or otherwise enable the imitation feature of the TVI application 36. In other examples, the imitation feature may simply be enabled upon determining at block 310 that the feature should be made available, and the imitation feature engagement is then shown through audiovisual means at block 316.

Referring once more to FIG. 2 and with continuing reference to FIGS. 1 and 3A-3D, upon determining that the constraint satisfaction monitor 300 has not been satisfied, i.e. that one or more of the performance monitor 304 and/or the safety monitor 306 includes constraints that have not been satisfied and that the imitation feature is not feasible at block 310, the TVI application 36 proceeds to block 114. At block 114, the TVI application 36 causes the ego vehicle 12 to switch to a manual driving mode in which the vehicle occupant 100 is in full or at least ADAS-assisted control of the ego vehicle 12. Additionally, at block 114, the TVI application 36 informs the vehicle occupant 100, via the HMI 22, 22', of the reasons for which the target vehicle 12' cannot be followed or imitated using the imitation feature of the TVI application 36. For example, the TVI application 36 may inform the vehicle occupant 100 that, "the target vehicle is over the speed limit", "the target vehicle is aggressive", or the like. From block 114, the TVI application 36 proceeds to block 116 and disengages or ends.

However, upon determining at block 310 that the imitation feature may be enabled, the TVI application 36 informs the vehicle occupants 100 via the HMI 22, 22' of the availability of the imitation feature at block 314, and may then switch to an imitation mode of operation. In the imitation mode, the TVI application 36 utilizes a predictive model such as model predictive control (MPC) 118 to model the ego and target vehicles 12, 12' and to optimize control signals that are then sent to the vehicle dynamics system 38 at block 120. While MPC 118 is contemplated as a predictive control model herein, it should be appreciated that other predictive learning models such as deep learning models, differentiable predictive control (DPC), machine learning models, and the like may be substituted or used in conjunction with MPC 118 without departing from the scope or intent of the present disclosure.

In several aspects, the control signals from the MPC 118 are commands to the vehicle dynamics system 38 actuators, such as the actuators of the powertrain 40, brakes 44 of a braking system, and/or steering system 46, to cause the ego vehicle 12 to follow and imitate the driving behavior of the target vehicle 12'. More specifically, the MPC 118 utilizes a cost function 122, the time/space horizon 124, and constraints 126 as inputs along with the target vehicle 12' trajectory from block 314 and the ego vehicle state 206 as determined by the ego vehicle's 12 onboard sensors 18.

Figures 4A, 4B:
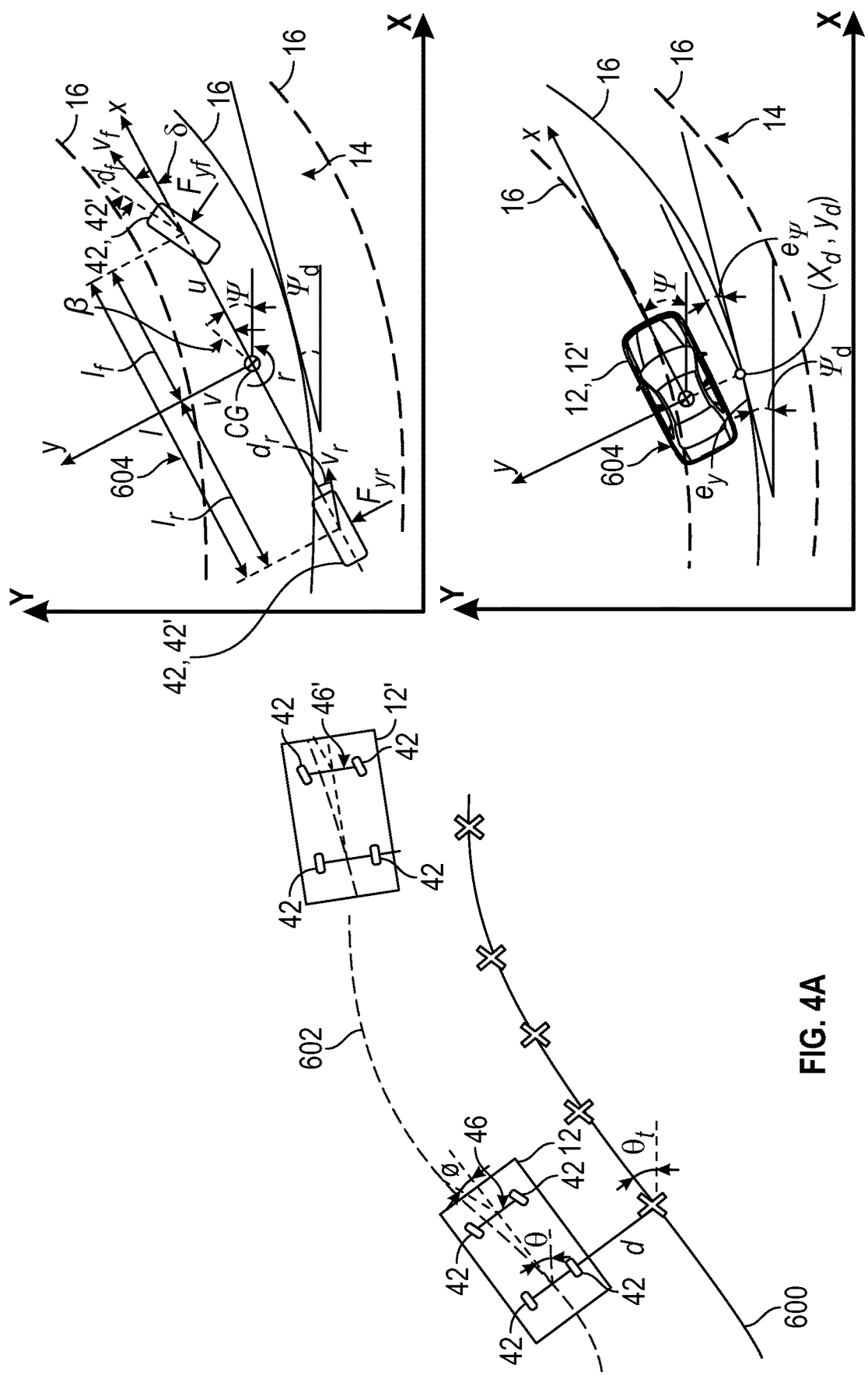
FIG. 4A is a partial environmental view of the system for imitating target vehicle behavior for automated driving of FIG. 1 depicting a planned path and trajectory to be followed by the ego vehicle according to an exemplary embodiment.
FIG. 4B includes two depictions of ego vehicle models of the system for imitating target vehicle behavior for automated driving of FIG. 1 according to an exemplary embodiment.

Turning now to FIGS. 4A and 4B and with continuing reference to FIGS. 1-3D, the MPC 118 is shown in further detail. The MPC 118 causes the ego vehicle 12 to follow a planned path 600 and to imitate target vehicle 12' behavior as the target vehicle 12' moves along a target path or trajectory 602. In order to efficiently achieve both the planned path 600 and imitate the target vehicle 12' behavior along the target path 602, the MPC 118 utilizes a predefined vehicle model 604. In some examples, the predefined vehicle model 604 is an approximation of the ego vehicle 12 that represents one or more of the ego vehicle 12 and the target vehicle 12' in a simplified form, such as bicycles, rather than vehicles having more than two wheels 42. However, while the predefined vehicle model 604 is shown as a bicycle model, it should be appreciated that other predefined vehicle models 604 including those having more than two wheels may be used without departing from the scope or intent of the present disclosure. The constraints 126 may include physical limitations such as road 14 conditions, speed limits, ambient conditions, and the like, and/or the constraints 126 may include limitations such as lookup time horizon, and so forth. The cost function 122 utilizes a variety of cost terms including but not limited to cross tracking error, orientation error, target vehicle 12' speed error, target vehicle 12' lateral motion, longitudinal motion, and yaw motion errors, and control energy, each of which will be described in further detail below. In several aspects, the MPC 118 focuses on substantially linear, stable driving conditions.

In several aspects, ego vehicle 12 and target vehicle 12' motion may be calculated with respect to the road 14 and lane markings 16 such as a centerline. A difference between the target vehicle 12' trajectory 602 and the planned path 600 is calculated at a plurality of time steps which are represented in FIG. 4A as Path_k, Path_k+1 . . . . Path_k+n where n is the nth time step and each Path_k is the position of the ego vehicle 12 at each of the n time steps. At each time step, a plurality of error factors are calculated. Specifically, a lateral distance error $e_y$ is defined as:

5. $\dot{e}_y = v_y + v_x \psi - v_x \psi_d = v_y + v_x e_\psi$, and a heading orientation error $e_\psi$ is defined by:

6. $e_\psi = \psi - \psi_d$; $\dot{e}_\psi = r - \dot{\psi}_d$; and

7. $\dot{\psi}_d = \frac{v_x}{R} = \rho v_x$.

Likewise a lateral motion and yaw motion of the ego vehicle 12 is formulated according to:

8. $m(\dot{v}_x - v_y r) = F_{xf} \cos \delta_f + F_{xr}$; $m(\dot{v}_y + v_x r) = F_{yf} \cos \delta_f + F_{yr}$;

and $I_z \dot{r} = F_{yf} \cos \delta_f l_f - F_{yr} l_r + \Delta M_z$.

From the lateral distance error $e_y$, heading orientation error $e_\psi$, lateral and yaw motion $m(\dot{v}_x - v_y r)$, $m(\dot{v}_y + v_x r)$, and $I_z \dot{r}$, the MPC application 118 of the TVI application 36 defines a state space formulation according to:

9. $\dot{x} = \bar{A}_c x + \bar{B}_c u + \bar{d}_c$, and $y = C_c x$, where $x = [v_x \ e_y \ v_y \ e_\psi \ r]^T$;

$u = [\delta_f \ T_{tol}]^T$, $y_1 = [e_y \ e_\psi]^T$, and $y_2 = [v_x \ v_y \ r]^T$.

The MPC application 118 also defines the cost function 122 that applies to imitation actions of the TVI application 36 as:

10. $J(x(t), U_t) = \sum_{k=1}^{N_p} \|y_{1t+k,t}\|_Q^2 +$ $\sum_{k=1}^{N_p} \|y_{2t+k,t} - y_{2dt+k,t}\|_S^2 + \sum_{k=0}^{N_p-1} \|u_{t+k,t}\|_R^2 + \sum_{k=0}^{N_p-1} \|\Delta u_{t+k,t}\|_T^2$ subject to 11. $x_{k+1|t} = \bar{A} x_{k|t} + \bar{B} u_{k|t} + \bar{d}$, which is a predicted relative future relative error with respect to the planned path 600 and ego vehicle 12 states $x = [v_x \ e_y \ v_y \ e_\psi \ r]^T$. The cost function 122 is also defined subject to 12. $x_{k|t} \in X \ \ k = t+1, \ldots t + N_p$, which define state constraints including a predefined allowable path tracking error, and target vehicle 12' stability. In addition, the cost function is defined subject to:

13. $u_{k|t} \in U \ \ k = t+1, \ldots t + N_c - 1$, which defines control input constraints such as the actual physical capacity of the vehicle dynamics system 38 actuators, a tire capacity, and the like. In several aspects, $y_2$ and $y_{2d}$ denote predicted states of the ego vehicle 12 and desired states from the target vehicle 12', respectively. $u_t$ denotes control actions for the vehicle dynamics system 38 actuators, Δu denotes a change rate for control actions for the vehicle dynamic system 38 actuators. $Q_t$, $S_t$, $R_t$ and $T_t$ are weights for path 600 tracking errors, target vehicle 12' behavior tracking error, vehicle dynamics system 38 actuator control actions and change rates of vehicle dynamics system 38 actuator control actions, respectively.

In several aspects, the $\Sigma_{k=1}^{N_p}\|y_{1t+k,t}\|_Q^2$ term of the cost function 122 accounts for path tracking errors, such as a heading angle error for the target vehicle 12' as well as a lateral error defining an error between a predicted lateral position of the target vehicle 12' and the actual lateral position of the target vehicle 12' on the road 14. The $\Sigma_{k=1}^{N_p}\|y_{2t+k,t}-y_{2dt+k,t}\|_S^2$ term of the cost function 122 accounts for target vehicle 12' behavior and tracking errors such as longitudinal, lateral, and/or yaw motion errors in the predicted target vehicle 12' motion and actual target vehicle 12' motion. The $\Sigma_{k=0}^{N_p-1}\|u_{t+k,t}\|_R^2$ of the cost function 122 accounts for control efforts, or more specifically, the relative size of the ego vehicle's 12 vehicle dynamics system 38 actuator actions required to continue to imitate and follow the behavior of the target vehicle 12'. The control efforts may apply to power steering requests for the steering system 46, torque requests for the powertrain 40 system, and/or braking requests for the braking system 44, and the like. Lastly, the $\Sigma_{k=0}^{N_p-1}\|\Delta u_{t+k,t}\|_T^2$ term of the cost function 122 accounts for the change rate Δu for control commands to the various vehicle dynamics system 38 actuators in order for the system 10 to continue to imitate and follow a selected target vehicle 12'.

Referring once more to FIG. 2 and with continuing reference to FIGS. 1 and 3A-4B, by minimizing the value of the cost function 122, and thereby minimizing the lateral distance error $e_y$, heading orientation error $e_\psi$, and other such path 600 and target vehicle 12' tracking errors, a future trajectory of the ego vehicle 12 may be planned accurately. That is, having applied the cost function 122, the MPC 118 outputs commands to one or more actuators of the ego vehicle 12 to continue to imitate the target vehicle 12' unless and until the TVI application 36 determines at block 310 that the constraints have not been met, and causes the ego vehicle 12 to switch to the manual driving mode in which the vehicle occupant 100 is in full or at least ADAS-assisted control of the ego vehicle 12. The TVI application 36 and system 10 then proceed to block 114, and inform the vehicle occupant 100, via the HMI 22, 22', of the reasons for which the target vehicle 12' cannot be followed or imitated using the imitation feature of the TVI application 36.

A system 10 and method implementing the TVI application 36 for an ego vehicle 12 to follow and imitate a target vehicle 12' of the present disclosure offers several advantages. These include the ability to operate to allow ego vehicles 12 to follow and imitate safely driven target vehicles 12' without requiring significant vehicle occupant 100 input, and while continuously monitoring MPC 118 parameters and fine-tuning MPC parameters to model and accurately imitate target vehicle 12' behavior without increasing complexity, while improving ADAS functionality and redundancy, and while maintaining or improving vehicle operator comfort.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for imitating target vehicle behavior in ego vehicle automated driving, the system comprising:
   one or more sensors of the ego vehicle and capturing ego vehicle condition information, and one or more sensors of the target vehicle and capturing target vehicle condition information;
   one or more actuators of a vehicle dynamics system disposed on the ego vehicle and selectively altering a state of the ego vehicle;
   one or more control modules disposed in the ego vehicle, each of the one or more control modules having a processor, a memory, and one or more input/output (I/O) ports, the I/O ports in communication with the one or more sensors of the ego vehicle and the one or more sensors of the target vehicle and with the one or more actuators; the memory storing programmatic control logic, the processor executing the programmatic control logic, the programmatic control logic including a target vehicle imitating (TVI) application comprising:
   a first control logic for estimating a target vehicle state, and for estimating a target vehicle trajectory, the ego vehicle condition information and the target vehicle condition information partially defining the target vehicle state and the target vehicle trajectory;
   a second control logic for evaluating target vehicle safety and performance constraints;
   a third control logic that selectively initiates an imitation mode of the ego vehicle based on a status of the target vehicle and the ego vehicle relative to the target vehicle safety and performance constraints, including:
     control logic that optimizes a planned ego vehicle path by minimizing a value of a cost function of a model predictive control (MPC) algorithm and constraining commands to the one or more actuators of the ego vehicle's vehicle dynamics system to be within predefined actuator constraints, wherein minimizing the value of the cost function further comprises:
       control logic that minimizes a value of a target vehicle tracking error, wherein the target vehicle tracking error comprises: a longitudinal motion error, a lateral motion error, and a yaw motion error, wherein each of the longitudinal, lateral, and yaw motion errors defines a difference between a predicted target vehicle motion and an actual target vehicle motion relative to the ego vehicle, wherein:
       a lateral distance error $e_y$, is defined as:
       $\dot{e}_y = v_y + v_x\psi - v_x\psi_d = v_y + v_x e_\psi$;
       a heading orientation error $e_\psi$ is defined by:
       $e_\psi = \psi - \psi_d$; $\dot{e}_\psi = r - \dot{\psi}_d$;
       $\dot{\psi}_d = v_x/R = \rho v_x$; and the cost function is defined as:
       $J(x(t), U_t) = \Sigma_{k=1}^{N_p}\|y_{1t+k,t}\|_Q^2 + \Sigma_{k=1}^{N_p}\|y_{2t+k,t} - y_{2dt+k,t}\|_S^2 + \Sigma_{k=0}^{N_p-1}\|u_{t+k,t}\|_R^2 + \Sigma_{k=0}^{N_p-1}\|\Delta u_{t+k,t}\|_T^2$, where $v_x$ is a velocity of the ego vehicle in a X-direction, $v_y$ is a velocity of the ego vehicle in a Y-direction, n is an nth time step, $u_{k|t} \in U$ $k=t+1 \ldots t+N_c-1$, defines control input constraints, $y_2$ and $y_{2d}$ denote predicted states of the ego vehicle and desired states from the target vehicle, respectively; $u_t$ denotes control actions for the vehicle dynamics system actuators, Δu denotes a change rate for control actions for the vehicle dynamic system actuators, $Q_t$, $S_t$, $R_t$ and $T_t$ are weights for path tracking errors, target vehicle 12' behavior tracking error, vehicle dynamics system actuator control actions and change rates of vehicle dynamics system actuator control actions, respectively;

a fourth control logic within the imitation mode, that engages the MPC algorithm that models the target vehicle and optimizes a planned ego vehicle path subject to actuator constraints; and a fifth control logic that generates outputs to the one or more actuators to cause the ego vehicle to follow the planned ego vehicle path and imitate driving behavior of the target vehicle.

2. The system of claim 1 wherein the first control logic further comprises:

control logic that generates fused sensor data by fusing data captured by the one or more sensors and data obtained from vehicle-to-vehicle (V2V) communications between the ego vehicle and the target vehicle;

control logic that filters the fused data and ego vehicle state data; and control logic that determines a time and space gap between the ego vehicle and the target vehicle from the fused data and the ego vehicle state data.

3. The system of claim 2 wherein the control logic that filters the fused data and the ego vehicle state data further comprises:

control logic that executes one or more of: a Kalman filter, an unscented Kalman filter, a Dynamic Data Reconciliation (DDR) filter, and a Particle filter.

4. The system of claim 2 wherein the first control logic further comprises:

control logic that generates a state buffer including ego vehicle state information, target vehicle state information, ego vehicle trajectory information, and target vehicle trajectory information at a plurality of time steps up to a maximum time and space horizon, wherein the maximum time and space horizon is defined by a coverage range of ego vehicle and target vehicle sensors.

5. The system of claim 4 wherein the second control logic further comprises:

control logic for applying target vehicle safety and performance constraints to data from the state buffer, wherein the target vehicle safety constraints comprise:
a speed limit, a target vehicle position relative to lane markings on a road surface, a time to a possible collision (TTC); and wherein the performance constraints comprise:
a status of each of the one or more sensors of the ego vehicle, a status of communications between the ego vehicle and the target vehicle, and a data latency.

6. The system of claim 4 wherein the third control logic further comprises:

control logic that, upon determining that the target vehicle performance constraints have been met, initiates an imitation mode of an advanced driver assistance system (ADAS) of the ego vehicle, and upon determining that the target vehicle performance constraints have not been met, informs a vehicle operator that the imitation mode is unavailable via a human-machine interface (HMI).

7. The system of claim 4 further comprising:

control logic that utilizes the ego vehicle state information, the maximum time and space horizon, and the target vehicle safety and performance constraints as inputs to the MPC algorithm;

control logic that generates a simplified model of one or more of the ego vehicle and the target vehicle, wherein in the simplified model, one or more of the ego vehicle and the target vehicle is represented as a bicycle; and control logic that models a planned path of the ego vehicle based on the target vehicle safety and performance constraints, the ego vehicle state, the maximum time and space horizon, the target vehicle state, and the target vehicle trajectory.

8. The system of claim 7 wherein the fifth control logic further comprises:

control logic that generates outputs to the one or more actuators, including:

power steering requests for a steering system, torque requests for a powertrain system, and braking requests for a braking system of the ego vehicle, wherein the outputs to the one or more actuators have magnitudes and directionality that cause the ego vehicle to follow and imitate driving behavior of the target vehicle while the target vehicle safety and performance constraints, and the actuator constraints are being met.

9. A method for imitating target vehicle behavior in ego vehicle automated driving, the method comprising:

capturing ego vehicle condition information with one or more sensors of the ego vehicle and capturing target vehicle condition information with one or more sensors of the target vehicle;

selectively altering a state of the ego vehicle with one or more actuators of a vehicle dynamics system disposed on the ego vehicle;

executing a programmatic control logic including a target vehicle imitating (TVI) application stored in memory of one or more control modules disposed on the ego vehicle, each of the one or more control modules having a processor, the memory, and one or more input/output (I/O) ports, the I/O ports in communication with the one or more sensors of the ego vehicle and of the target vehicle, and in communication with the one or more actuators; the processor executing the programmatic control logic, including:

estimating a target vehicle state, and for estimating a target vehicle trajectory, the ego vehicle condition information and the target vehicle condition information partially defining the target vehicle state and the target vehicle trajectory;

evaluating target vehicle safety and performance constraints;

selectively initiating an imitation mode of the ego vehicle based on a status of the target vehicle and the ego vehicle relative to the target vehicle safety and performance constraints, including:

optimizing a planned ego vehicle path by minimizing a value of a cost function of a model predictive control (MPC) algorithm and constraining commands to the one or more actuators of the ego vehicle's vehicle dynamics system to be within predefined actuator constraints, wherein minimizing the value of the cost function further comprises:

minimizing a value of a target vehicle tracking error, wherein the target vehicle tracking error comprises: a longitudinal motion error, a lateral motion error, and a yaw motion error, wherein each of the longitudinal, lateral, and yaw motion errors defines a difference between a predicted target vehicle motion and an actual target vehicle motion relative to the ego vehicle, wherein:

a lateral distance error $e_y$ is defined as:
$\dot{e}_y = v_y + v_x \psi - v_x \psi_d = v_y + v_x e_\psi$;
a heading orientation error $e_\psi$ is defined by:
$e_\psi = \psi - \psi_d$; $\dot{e}_\psi = r - \dot{\psi}_d$;
$\dot{\psi}_d = v_x/R = \rho v_x$; and the cost function is defined as:
$J(x(t), U_t) = \sum_{k=1}^{N_p} \|y_{1t+k,t}\|_Q^2 + \sum_{k=1}^{N_p} \|y_{2t+k,t} - y_{2dt+k,t}\|_S^2 + \sum_{k=0}^{N_p-1} \|u_{t+k,t}\|_R^2 + \sum_{k=0}^{N_p-1} \|\Delta u_{t+k,t}\|_T^2$,
where $v_x$ is a velocity of the ego vehicle in a X-direction, $v_y$ is a velocity of the ego vehicle in a Y-direction, n is an nth time step, $u_{k|t} \in U$ k=t+1 . . . t+$N_c$-1, defines control input constraints, $y_2$ and $y_{2d}$ denote predicted states of the ego vehicle and desired states from the target vehicle, respectively; $u_t$ denotes control actions for the vehicle dynamics system actuators, $\Delta u$ denotes a change rate for control actions for the vehicle dynamic system actuators, $Q_t$, $S_t$, $R_t$ and $T_t$ are weights for path tracking errors, target vehicle 12' behavior tracking error, vehicle dynamics system actuator control actions and change rates of vehicle dynamics system actuator control actions, respectively;
engaging the MPC algorithm within the imitation mode, that models the target vehicle and optimizes a planned ego vehicle path subject to actuator constraints; and
generating outputs to the one or more actuators and causing the ego vehicle to follow the planned ego vehicle path and imitate driving behavior of the target vehicle.

10. The method of claim 9 further comprising:
generating fused sensor data by fusing data captured by the one or more sensors of the ego vehicle and data obtained from vehicle-to-vehicle (V2V) communications between the ego vehicle and the target vehicle;
filtering the fused data and ego vehicle state data; and
determining a time and space gap between the ego vehicle and the target vehicle from the fused data and the ego vehicle state data.

11. The method of claim 10 wherein filtering the fused data and the ego vehicle state data further comprises:
filtering the fused data with one or more of: a Kalman filter, an unscented Kalman filter, a Dynamic Data Reconciliation (DDR) filter, and a Particle filter.

12. The method of claim 10 further comprising:
generating a state buffer including ego vehicle state information, target vehicle state information, ego vehicle trajectory information, and target vehicle trajectory information at a plurality of time steps up to a maximum time and space horizon, wherein the maximum time and space horizon is defined by a coverage range of ego vehicle and target vehicle sensors.

13. The method of claim 12 further comprising:
applying target vehicle safety and performance constraints to data from the state buffer,
wherein the target vehicle safety constraints comprise:
a speed limit, a target vehicle position relative to lane markings on a road surface, a time to a possible collision (TTC); and
wherein the performance constraints comprise:
a status of each of the one or more sensors, a status of communications between the ego vehicle and the target vehicle, and a data latency.

14. The method of claim 12 further comprising:
upon determining that the target vehicle performance constraints have been met, initiating the imitation mode of an advanced driver assistance system (ADAS) of the ego vehicle; and
upon determining that the target vehicle performance constraints have not been met, informing a vehicle operator that the imitation mode is unavailable via a human-machine interface (HMI).

15. The method of claim 12 further comprising:
utilizing the ego vehicle state information, the maximum time and space horizon, and the target vehicle safety and performance constraints as inputs to the MPC algorithm;
generating a simplified model of one or more of the ego vehicle and the target vehicle, wherein in the simplified model, one or more of the ego vehicle and the target vehicle is represented as a bicycle; and
modeling a planned path of the ego vehicle based on the target vehicle safety and performance constraints, the ego vehicle state, the maximum time and space horizon, the target vehicle state, and the target vehicle trajectory.

16. The method of claim 15 further comprising:
generating outputs to the one or more actuators, including:
generating power steering requests for a steering system, generating torque requests for a powertrain system, and generating braking requests for a braking system of the ego vehicle, wherein the outputs to the one or more actuators have magnitudes and directionality that cause the ego vehicle to follow and imitate driving behavior of the target vehicle while the target vehicle safety and performance constraints, and the actuator constraints are being met.

17. A method for imitating target vehicle behavior in ego vehicle automated driving, the method comprising:
capturing ego vehicle condition information with one or more sensors of the ego vehicle and capturing target vehicle condition information with one or more sensors of the target vehicle;
selectively altering a state of the ego vehicle with one or more actuators of a vehicle dynamics system disposed on the ego vehicle;
executing a target vehicle imitating (TVI) application stored in memory of one or more control modules disposed on the ego vehicle, each of the one or more control modules having a processor, the memory, and one or more input/output (I/O) ports, the I/O ports in communication with the one or more sensors of the ego vehicle and of the target vehicle, and in communication with the one or more actuators; the processor executing programmatic control logic, including:
estimating a target vehicle state, and for estimating a target vehicle trajectory, the ego vehicle condition information and the target vehicle condition information partially defining the target vehicle state and the target vehicle trajectory;
generating fused sensor data by fusing data captured by the one or more sensors of the ego vehicle and data obtained from vehicle-to-vehicle (V2V) communications between the ego vehicle and the target vehicle;
filtering the fused data and ego vehicle state data with one or more of: a Kalman filter, an unscented Kalman filter, a Dynamic Data Reconciliation (DDR) filter, and a Particle filter;
determining a time and space gap between the ego vehicle and the target vehicle from the fused data and the ego vehicle state data;
generating a state buffer including ego vehicle state information, target vehicle state information, ego vehicle trajectory information, and target vehicle trajectory information from filtered fused data at a plurality of time steps up to a maximum time and space horizon, wherein the maximum time and space horizon is defined by a coverage range of the one or more ego vehicle and one or more target vehicle sensors;

evaluating target vehicle safety and performance constraints by applying target vehicle safety and performance constraints to data from the state buffer, wherein the target vehicle safety constraints comprise:
  a speed limit, a target vehicle position relative to lane markings on a road surface, a time to a possible collision (TTC); and wherein the performance constraints comprise:
  a status of each of the one or more sensors, a status of communications between the ego vehicle and the target vehicle, and a data latency;

upon determining that the target vehicle performance constraints have been met, initiating an imitation mode of an advanced driver assistance system (ADAS) of the ego vehicle, including:
  optimizing a planned ego vehicle path by minimizing a value of a cost function of a model predictive control (MPC) algorithm and constraining commands to the one or more actuators of the ego vehicle's vehicle dynamics system to be within predefined actuator constraints, wherein minimizing the value of the cost function further comprises:
    minimizing a value of a target vehicle tracking error, wherein the target vehicle tracking error comprises: a longitudinal motion error, a lateral motion error, and a yaw motion error, wherein each of the longitudinal, lateral, and yaw motion errors defines a difference between a predicted target vehicle motion and an actual target vehicle motion relative to the ego vehicle, wherein:
    a lateral distance error $e_y$ is defined as:
    $\dot{e}_y = v_y + v_x \psi - v_x \psi_d = v_y + v_x e_\psi$;
    a heading orientation error $e_\psi$ is defined by:
    $e_\psi = \psi - \psi_d$; $\dot{e}_\psi = r - \dot{\psi}_d$;
    $\dot{\psi}_d = v_x/R = \rho v_x$; and the cost function is defined as:
    $J(x(t), U_t) = \Sigma_{k=1}^{N_p} \|y_{1t+k,t}\|_Q^2 + \Sigma_{k=1}^{N_p} \|y_{2t+k,t} - y_{2dt+k,t}\|_S^2 + \Sigma_{k=0}^{N_p-1} \|u_{t+k,t}\|_R^2 + \Sigma_{k=0}^{N_p-1} \|\Delta u_{t+k,t}\|_T^2$, where $v_y$ is a velocity of the ego vehicle in a X-direction, $v_y$ is a velocity of the ego vehicle in a Y-direction, n is an nth time step, $u_{k|t} \in U$ $k=t+1, \ldots t+N_c-1$, defines control input constraints, $y_2$ and $y_{2d}$ denote predicted states of the ego vehicle and desired states from the target vehicle, respectively; $u_t$ denotes control actions for the vehicle dynamics system actuators, $\Delta u$ denotes a change rate for control actions for the vehicle dynamic system actuators, $Q_t$, $S_t$, $R_t$ and $T_t$ are weights for path tracking errors, target vehicle 12' behavior tracking error, vehicle dynamics system actuator control actions and change rates of vehicle dynamics system actuator control actions, respectively;

upon determining that the target vehicle performance constraints have not been met, informing a vehicle operator that the imitation mode is unavailable via a human-machine interface (HMI);

selectively initiating an imitation mode of the ego vehicle based on a status of the target vehicle and the ego vehicle relative to the target vehicle safety and performance constraints;

engaging the MPC algorithm within the imitation mode, that models the target vehicle and optimizes a planned ego vehicle path subject to actuator constraints;

utilizing the ego vehicle state information, the maximum time and space horizon, and the target vehicle safety and performance constraints as inputs to the MPC algorithm;

generating a simplified model of one or more of the ego vehicle and the target vehicle, wherein in the simplified model, one or more of the ego vehicle and the target vehicle is represented as a bicycle;

modeling a planned path of the ego vehicle based on the target vehicle safety and performance constraints, the ego vehicle state, the maximum time and space horizon, the target vehicle state, and the target vehicle trajectory;

optimizing the planned ego vehicle path by minimizing a value of a cost function of the MPC algorithm, including:

minimizing a value of a target vehicle tracking error, wherein the target vehicle tracking error comprises: a longitudinal motion error, a lateral motion error, and a yaw motion error, wherein each of the longitudinal, lateral, and yaw motion errors defines a difference between a predicted target vehicle motion and an actual target vehicle motion relative to the ego vehicle;

constraining commands to the one or more actuators of the ego vehicle's vehicle dynamics system to be within predefined actuator constraints; and generating outputs to the one or more actuators, including:

generating power steering requests for a steering system, generating torque requests for a powertrain system, and generating braking requests for a braking system of the ego vehicle, wherein the outputs to the one or more actuators have magnitudes and directionality that cause the ego vehicle to follow and imitate driving behavior of the target vehicle while the target vehicle safety and performance constraints, and the actuator constraints are being met.

* * * * *